(12) United States Patent
Donegan

(10) Patent No.: US 11,029,024 B2
(45) Date of Patent: Jun. 8, 2021

(54) PYROLYSIS RETORT METHODS AND APPARATUS

(71) Applicant: STANDARD GAS LIMITED, London (GB)

(72) Inventor: Daniel Michael Donegan, Hatfield Peverel (GB)

( * ) Notice: Subject to any disclaimer, the term of this patent is extended or adjusted under 35 U.S.C. 154(b) by 158 days.

(21) Appl. No.: 15/554,883

(22) PCT Filed: Mar. 4, 2016

(86) PCT No.: PCT/GB2016/050587
§ 371 (c)(1),
(2) Date: Aug. 31, 2017

(87) PCT Pub. No.: WO2016/139495
PCT Pub. Date: Sep. 9, 2016

(65) Prior Publication Data
US 2018/0051876 A1   Feb. 22, 2018

(30) Foreign Application Priority Data

Mar. 5, 2015   (GB) ...................... 1503765

(51) Int. Cl.
*F23G 5/027*   (2006.01)
*B23K 20/08*   (2006.01)
(Continued)

(52) U.S. Cl.
CPC ............ *F23G 5/027* (2013.01); *B23K 20/002* (2013.01); *B23K 20/085* (2013.01);
(Continued)

(58) Field of Classification Search
CPC ......... F23G 5/027; Y02E 50/14; Y02E 50/30; Y02E 50/32; Y02E 50/10; Y02E 50/16; Y02E 50/13; Y02E 50/15; Y02E 50/17; Y02E 50/343; Y02E 60/122; Y02E 20/12; Y02E 20/14; Y02E 20/18; Y02E 10/41;
(Continued)

(56) References Cited

U.S. PATENT DOCUMENTS 3,292,253 A * 12/1966 Rossner ................. B23K 20/08
                                                            228/107
3,357,377 A * 12/1967 Stevens .................. F23G 5/027
                                                            110/190
(Continued)

FOREIGN PATENT DOCUMENTS

| CN | 203355644 U | * 12/2013 |
| JP | 2003004213 A | 1/2003 |
| JP | 2003292964 A | 10/2003 |

OTHER PUBLICATIONS

International Search Report and Written Opinion of the European Patent Office International Search Authority for International application No. PCT/GB2016/050587 dated Jun. 14, 2016.
(Continued)

*Primary Examiner* — Jason Lau
(74) *Attorney, Agent, or Firm* — Procopio, Cory, Hargreaves & Savitch LLP

(57) ABSTRACT

A pyrolysis surface such as a rotating retort is provided by copper sheet supported by a nickel alloy framework. Pyrolysis is used to destroy calorific waste and/or to produce gas therefrom.

19 Claims, 12 Drawing Sheets

(51) Int. Cl.
  *B23K 20/227* (2006.01)
  *F23G 5/20* (2006.01)
  *B23K 20/233* (2006.01)
  *C10B 53/00* (2006.01)
  *C10B 47/30* (2006.01)
  *B23K 20/00* (2006.01)
  *B23K 101/06* (2006.01)
  *B23K 103/12* (2006.01)
  *B23K 103/22* (2006.01)
  *B23K 103/18* (2006.01)
  *B23K 101/14* (2006.01)
  *B23K 103/04* (2006.01)

(52) U.S. Cl.
  CPC .......... *B23K 20/227* (2013.01); *B23K 20/233* (2013.01); *C10B 47/30* (2013.01); *C10B 53/00* (2013.01); *F23G 5/20* (2013.01); *B23K 2101/06* (2018.08); *B23K 2101/14* (2018.08); *B23K 2103/05* (2018.08); *B23K 2103/12* (2018.08); *B23K 2103/18* (2018.08); *B23K 2103/22* (2018.08); *B23K 2103/26* (2018.08); *F23G 2203/201* (2013.01); *F23G 2203/208* (2013.01); *F23G 2203/209* (2013.01); *F23G 2205/10* (2013.01)

(58) Field of Classification Search
  CPC ..... Y02E 10/547; Y02E 60/17; Y02E 60/366; Y02E 60/526; Y02E 60/528
  See application file for complete search history.

(56) References Cited

U.S. PATENT DOCUMENTS

| | | | |
|---|---|---|---|
| 4,934,283 A | 6/1990 | Kydd | |
| 4,983,214 A * | 1/1991 | Bottinelli | F27B 7/2083 266/158 |
| 5,485,736 A | 1/1996 | Collier et al. | |
| 5,662,052 A * | 9/1997 | McIntosh | C10B 47/30 110/229 |
| 6,919,049 B1 | 7/2005 | Roux | |
| 2006/0053791 A1* | 3/2006 | Prentice, III | F23G 5/006 60/645 |
| 2012/0125758 A1* | 5/2012 | Hoetzl | C10J 3/62 201/14 |

OTHER PUBLICATIONS

UKIPO Search Report under Section 17(5) for UK application GB1503765.8 dated Apr. 1, 2016.

UKIPO Examination Report under Section 18(3) for UK application GB1503765.8 dated Oct. 18, 2016.

UKIPO Examination Report under Section 18(3) for UK application GB1503765.8 dated Nov. 22, 2016.

* cited by examiner

PYROLYSIS RETORT METHODS AND APPARATUS

CROSS REFERENCE TO RELATED APPLICATIONS

This application is a United States National Phase Application PCT/GB2016/050587 filed Mar. 4, 2016, and claims priority to United Kingdom Patent Application No. 1503765.8 filed Mar. 5, 2015, all of which are incorporated by reference herein.

FIELD OF DISCLOSURE

The present invention generally relates to pyrolysis and gasification methods and apparatus. Pyrolysis is used to destroy calorific waste and/or to produce gas therefrom. The destruction of calorific waste is desirable to avoid the need for environmental damage due to burial in landfill sites, or dumping at sea. However, some forms of destruction create gaseous pollution and/or carbon dioxide, leading to environmental damage and potentially increasing global warming. It can also be used to convert carbon-containing feeds such as lignite into gas.

BACKGROUND

Advanced Thermal Treatment (ATT) primarily relates to technologies that employ pyrolysis or gasification. ATT is discussed in the Brief, entitled 'Advanced thermal treatment of municipal solid waste' produced by the Department for Environment, Food & Rural Affairs of the UK Government (https://www.gov.uk/government/publications/advanced-thermal-treatment-of-municipal-solid-waste). That Brief indicates a problem with conventional pyrolysis and gasification systems is tarring, in which the build up of tar can cause operational problems (for example, if tar build up causes blockages).

Pure pyrolysis is a process of thermochemical decomposition of material to produce gas, in which oxygen is absent. If a small quantity of oxygen is present, the production of gas is termed gasification. The amount of oxygen present in gasification is insufficient to allow combustion to occur. In the present application, unless otherwise specified, pyrolysis and gasification will have the same meaning.

Gas is released from a feed material or 'feedstock', leaving solid matter (char) as a by-product. The skilled person will understand that the term 'feedstock' as used throughout this description relates to any solid material having a calorific value. Feedstocks typically envisaged in this context are waste materials such as biomass, wood or paper, rubber tyres, plastics and polythene, or sewage solids. They also include low quality fossil fuels such as lignite or bituminous coals.

The released gas, termed synthetic gas or "Syngas" hereafter, can then be used as a fuel, to generate heat or electricity either on the spot or elsewhere. If carbonaceous material is used as the feedstock, the resulting solid residue ("char") is generally richer in carbon. That char also may be used as a secondary fuel source.

Generally, conventional pyrolysis processes do not result in Syngas pure enough to be input into a generator. Instead, the Syngas must first be put through a rigorous cleaning (scrubbed) process, so that any remaining particulate matter and tar are removed from the Syngas. The retention of tar and oil is the consequence of insufficient temperature and dwell time.

It is known in the art that use of a $CO_2$ atmosphere may improve the yield of Syngas produced from a pyrolysis process. "An Investigation into the Syngas Production From Municipal Solid Waste (MSW) Gasification Under Various Pressure and $CO_2$ Concentration" (Kwon et al, presented at the $17^{th}$ Annual North American Waste-to-Energy Conference 18-20 May 2009, Chantilly, Va., US, Proc 17th Annual North American Waste-to-Energy Conference NAWTEC17, paper NAWTEC17-2351) discloses that $CO_2$ injection enables further char reduction, and produces a significantly higher proportion of CO. Additionally, $CO_2$ injection reduces the levels of Polycyclic Aromatic Hydrocarbons (PAHs), which can be directly related to tar and coke formation during a gasification process.

In conventional pyrolysis devices, a portion of the retort in physical contact with the feedstock will be cooler than the remainder of the retort. In the conventional arrangement, feedstock falls to the bottom of the retort, meaning that a significant proportion of the surface of the retort is not in contact with the feedstock. Thus, only a small proportion of the retort is used to conductively heat the feedstock. This causes temperature gradients on the surface, which reduces heating efficiency and complicates control over the temperature within the retort.

WO2005/116524 describes an apparatus and process for converting carbonaceous or other material with calorific value into gas. The arrangement of WO2005/116524 includes a main gasifier and a secondary gasifier. The main gasifier is a rotary kiln consisting of a rotating, slightly inclined metal retort in the form of a shell or tube which transports fuel along its length. The exhaust gas from the secondary gasifier external to the kiln heats the tube.

Rotation allows the cooler portion of the retort to move out of physical contact with the feedstock, and allows that portion to be re-heated. The rotatable retort also has the advantage of churning the feedstock, to physically break it down into smaller pieces thereby exposing a greater surface area of the feedstock to heating (by conduction, convection and radiation). As the retort is driven (e.g. rotated) to move the feedstock, it needs to maintain its mechanical strength at high temperatures.

WO 2009/133341 relates to such a gasifier in which internal vanes are attached to the rotating vessel or retort, and constructed in such a way that the feedstock falls initially onto the inner surface of the vanes nearest the longitudinal axis. The feedstock then falls through gaps between the vanes to reach outer chambers of the rotating vessel. The vanes are intended to assist homogeneous distribution of the feed material over an increased surface area of the retort whilst providing heating gas to an increased surface area extending into the retort interior.

Means for Solving the Problem

An aspect of the present invention is a pyrolysis structure at least part of which is constructed of a sheet of high thermal conductivity material explosively welded to a high temperature strength framework. The high thermal conductivity material is preferably a non-transition metal, very preferably relatively pure copper (but alternatively silver). The high temperature strength framework may be made from a nickel alloy.

The structure of the present aspect of the invention thus has the thermal conductivity characteristics of copper (which is of the order of 30 times that of Nickel alloys) along with the high temperature strength of a nickel alloy framework, which has the mechanical strength lacked by the copper at elevated pyrolysis temperatures.

Although the thermal coefficients of expansion of the high thermal conductivity material sheets may differ from those of the high temperature strength framework, which would lead to differential expansion stresses as the structure is heated and cooled in use over a range of several hundred degrees, and despite a hostile environment which includes steam, gases, tars and unknown contaminants, the explosive welding process has been found to maintain a reliable join. Explosive (or explosion) welding (or bonding) was first described in U.S. Pat. No. 3,140,539 (Holtzman).

Accordingly, as the thermal conductivity through the structure is higher, there is a lower temperature drop between the outside (which is where heat is applied) and the inside (which is where pyrolysis occurs), so that a lower temperature can be applied to the structure in order to heat a calorific material to a temperature sufficient for pyrolysis, or a shorter dwell time (and hence higher volume throughput of waste material and higher generation rate of syngas) can be achieved for the same temperature.

In conventional stainless steel or nickel alloy retort structures, a high temperature applied to one location of the retort structure by a heating system would not necessarily be transferred throughout the retort structure, and therefore to the feedstock, due to the low conductivity of the construction materials. There are thus temperature gradients within the retort: firstly, along its length from the point where the heating system is coupled to the retort, and secondly, radially from the outside of the retort where the heat is applied to the inside where the feedstock is located. The faster the transit speed of material through the retort, the steeper the radial temperature gradient across the retort and hence the higher the temperature which must be applied by the heating system in order to reach a given pyrolysis temperature of the feedstock. Not all of the large amount of applied heat required can readily be recovered, reducing the thermal efficiency of the process.

However, the materials with the highest thermal conductivity—relatively pure copper, silver and (to a lesser extent) gold—cannot be used because their mechanical strength at the high temperatures required for pyrolysis is too low, and/or their creep and/or fatigue resistance is insufficient, for long-term use with solid waste materials. Attempts to strengthen these materials by alloying reduce their thermal conductivity to varying degrees, with the very additives which most improve the strength tend also to most degrade the thermal conductivity. Silver, for example, dissolves well in copper and thus degrades conductivity less than other elements, but offers relatively little improvement in strength.

Strengthening by modifying the microstructure would be ineffective because pyrolysis takes place typically above the annealing temperature of copper (around 400 degrees Kelvin). Thus, to the inventors' knowledge, copper has hitherto not been used as a pyrolysis surface.

Using the high thermal conductivity of copper allows the present aspect of the invention to efficiently equalise temperature applied to the retort structure throughout the entire retort structure. Accordingly, the temperature applied to the outside of the retort structure by the heating system does not have to be as great in order to transfer a sufficient temperature for pyrolysis to the feedstock.

The use of copper for the retort structure also improves the local heat distribution within the retort structure, and therefore reduces temperature variation across the retort structure. This, in turn, lowers the onset of "hotspots" along the surface of the retort structure beneath the points where the relatively cool feedstock sits. In addition to these advantages, the pyrolysis process in the retort structure may be further improved. For example, the gas produced may include Syngas combined with particulate matter and tar. Conventional units may send this gas to be cleaned or purified.

Advantageously, the invention is applied as an inclined rotating retort of the type described above. In another embodiment, the structure may be a flat plate over which feedstock passes.

In another aspect, the invention provides a method of making a pyrolysis contacting structure comprising the steps of placing together a sheet of high thermal conductivity metal and a second sheet of high temperature strength metal, and explosively welding the sheets together. Preferably, the second sheet is continuous, and the process further comprises milling away regions of the second sheet to expose the first sheet, leaving a framework of the high temperature strength metal.

Advantageously, the present invention can reduce the amount of waste going to landfill, and convert waste into useful end products. For example, char produced may be useful as a secondary fuel for the heating system.

Waste processed by the present invention can be converted into Syngas and vitrified slag. The Syngas can then be used to produce electricity (as described above) and the vitrified slag can be used in the construction industry. The process redirects waste from landfill; also an existing landfill site may be mined to provide feedstock. Moreover, the amount of recyclable waste being used as feedstock can be reduced as the present invention is capable of processing a vast range of feedstock as the process is not fuel specific. Additionally, it is an object of the present invention to be capable of processing hazardous waste, by utilising corrosion resistant materials.

Additionally, some aspects of the present invention are able to deal more effectively than conventional pyrolysis apparatus and techniques with the hydrocarbons associated with the retention of tar and oil thereby obviating the need for an oil refinery.

The heat provided for the process is preferably from calorific waste (of a homogenous consistency) with the resultant char generated by the process being utilised as a secondary fuel source. The use of this fuel type enables the correct energy balance within the process to be maintained. The volumes of the resultant char would sometimes be insufficient for use as the primary fuel because feed stock types can produce both varying and minimal volumes of char. Additionally, in some cases it may be desired to sell the char as a fuel product for use elsewhere.

BRIEF DESCRIPTION OF THE DRAWINGS

Various embodiments and aspects of the present invention are described without limitation below, with reference to the accompanying figures in which.

DETAILED DESCRIPTION OF A FIRST PREFERRED EMBODIMENT

The pyrolysis unit of the first preferred embodiment will now be described in detail on the assumption that the start-up process has already taken place.

Figure 1:
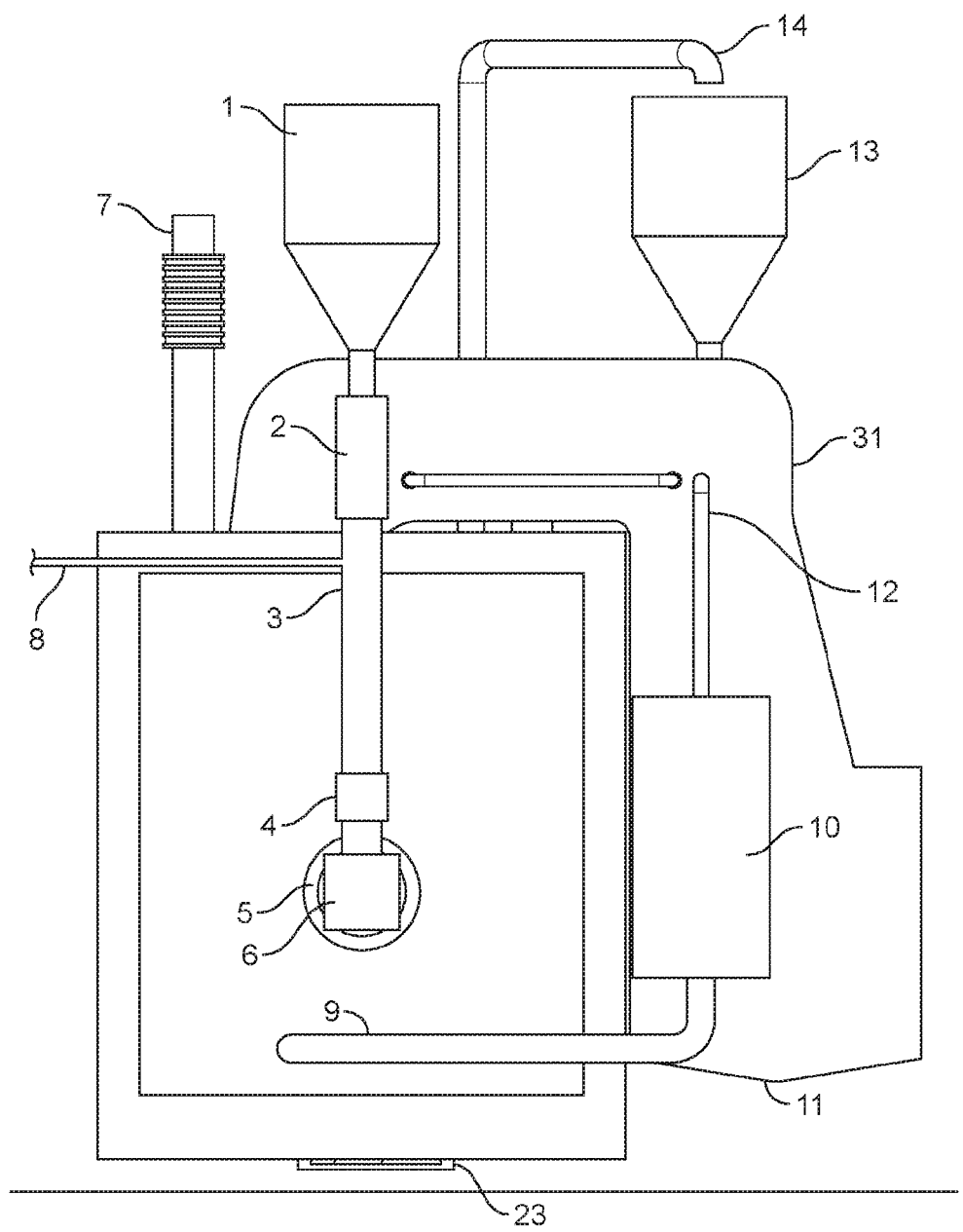
FIG. 1 is a sectional end elevation of a pyrolysis unit according to a first preferred embodiment.
Figure 2:
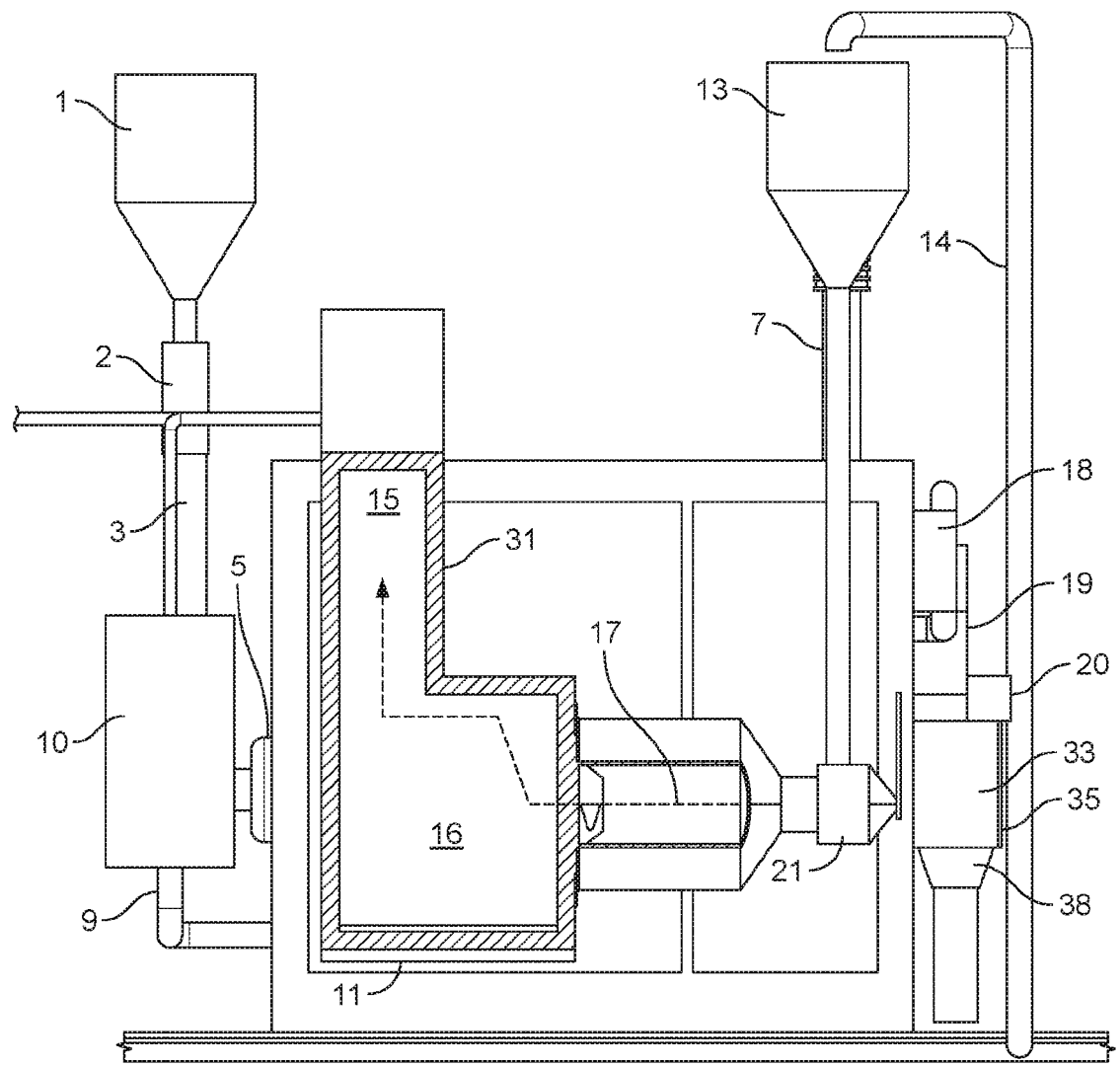
FIG. 2 is a sectional side elevation of that pyrolysis unit.
Figure 5:
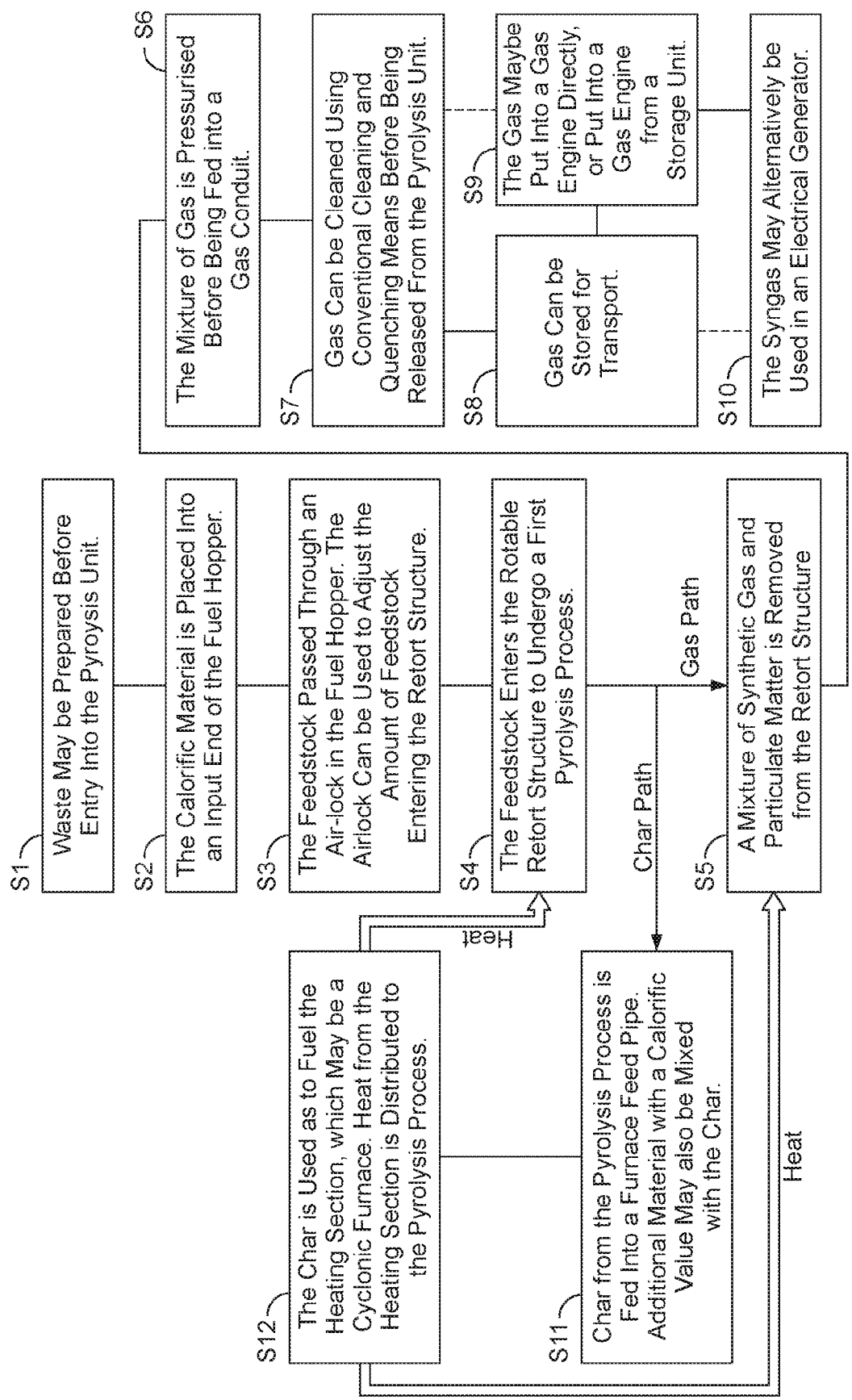
FIG. 5 is a flow diagram of the first embodiment showing a process of taking feedstock and converting it into usable products.
Figure 6:
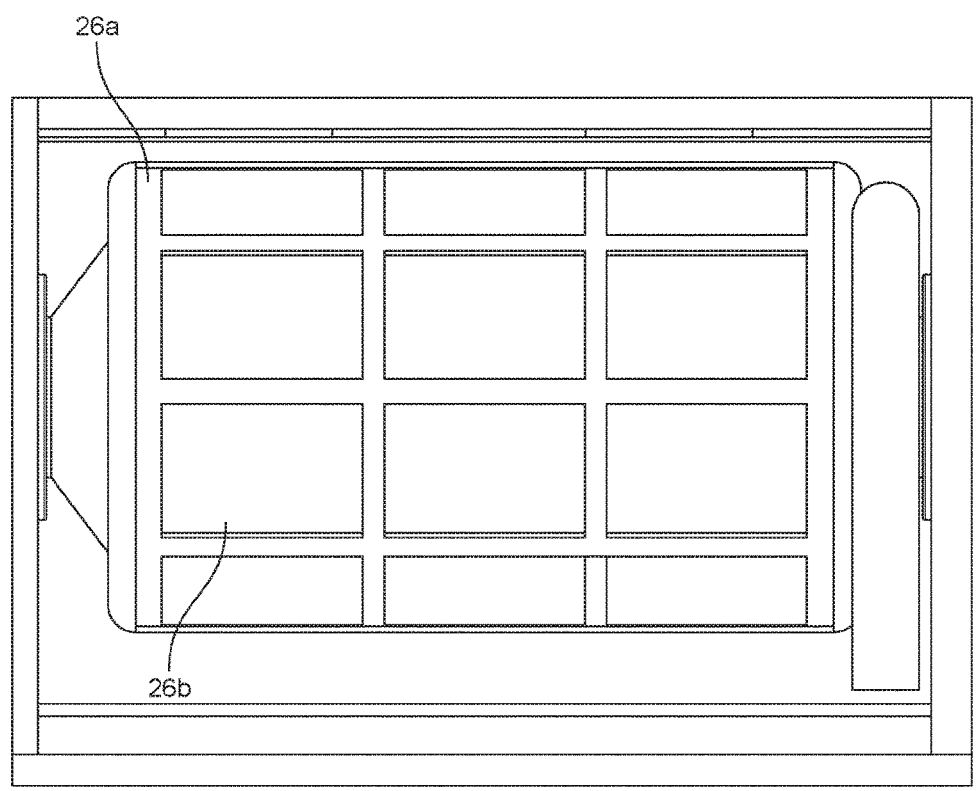
FIG. 6 is a side elevation of the retort structure of the first embodiment.
Figure 7:
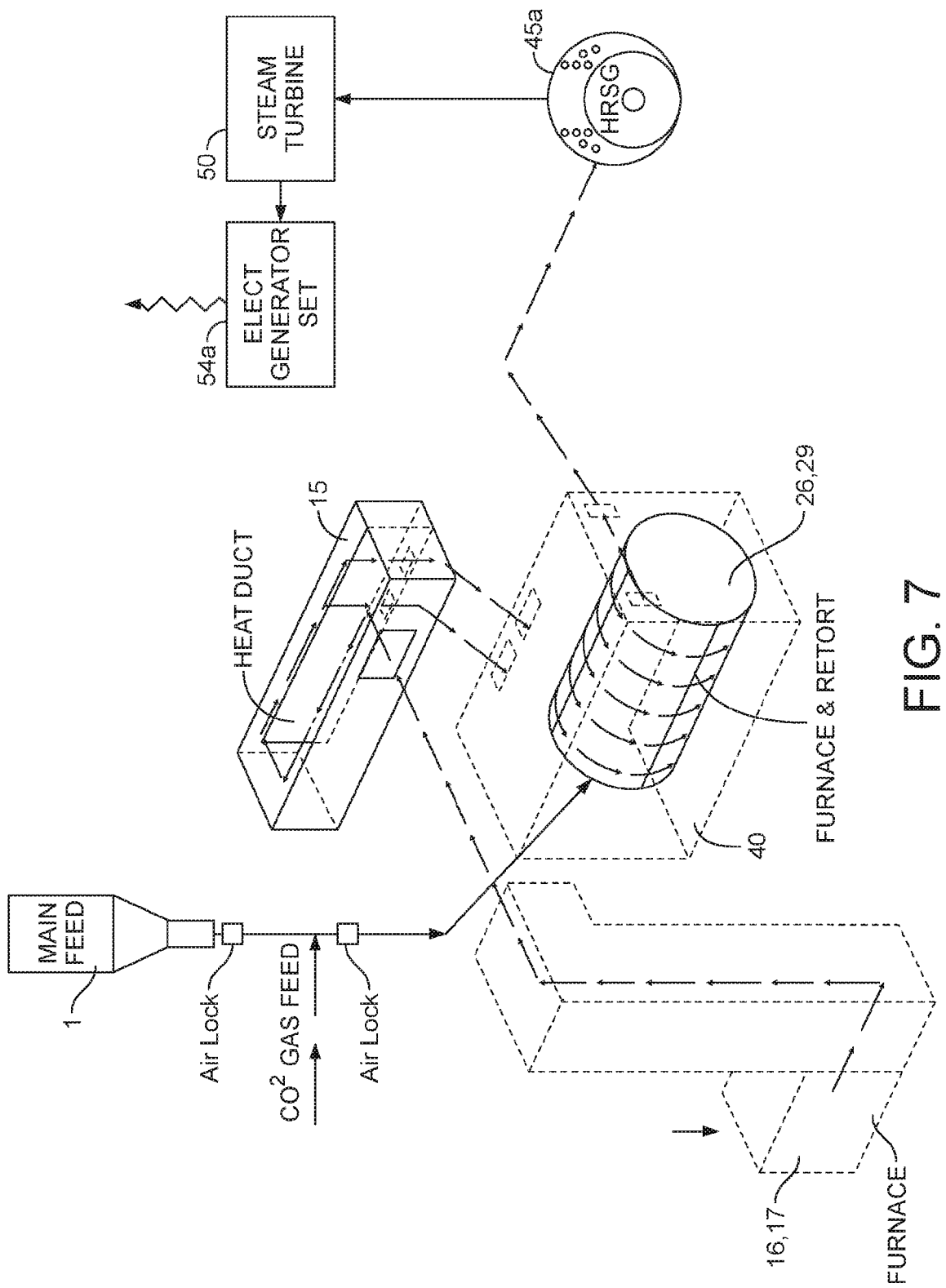
FIG. 7 is an exploded schematic isometric view of the main elements of the second embodiment.

With reference to FIGS. 1 and 5, the pyrolysis unit includes a pyrolysis retort feed 1 to allow feedstock to enter the pyrolysis unit. The retort feed 1 is shaped to funnel feedstock into a substantially vertical feed pipe 3. An airlock 2, which may be a double action airlock, is located toward the top of the feed pipe 3, but below the retort feed 1. The airlock 2 is designed to maintain a positive pressure inside the feed pipe 3, thereby preventing air entering the feedpipe 3.

The double action airlock of this embodiment comprises first and second hydraulically actuated blades 2a, 2b (not shown) in series in the feed pipe, each capable of closing the pipe and acting additionally as safety barriers to the environment under control of an electronic control unit (not shown but indicated herein as 100). Feedstock falls onto the first 2a. When the second 2b is closed, the first 2a opens to admit the feedstock. When the first 2a closes again, the second opens to allow the feedstock into the apparatus. At no time are both open. Both may be closed together, to provide a double safety barrier.

A side feed airlock 4 is located toward the bottom of the feed pipe 3. The feed pipe 3 may include a $CO_2$ feed supply 8, which may allow $CO_2$ to enter the feed pipe 3, between the double action airlock 2 and the side feed airlock 4, in controlled volumes. The bottom of the feed pipe 3 is connected to a substantially horizontal pipe 27, which includes an auger 37 for transporting the feedstock toward a rotable retort structure. The auger 37 for transporting the feedstock to the retort structure is of nickel alloy and is driven by a motor 6. The diameter of the auger 37 is 12 inches (0.3 m). The feed system in the present embodiment enables fuel of a homogeneous consistency (of a specific size) to flow freely in, which facilitates the pyrolysis within the retort taking place more efficiently.

Figure 4:
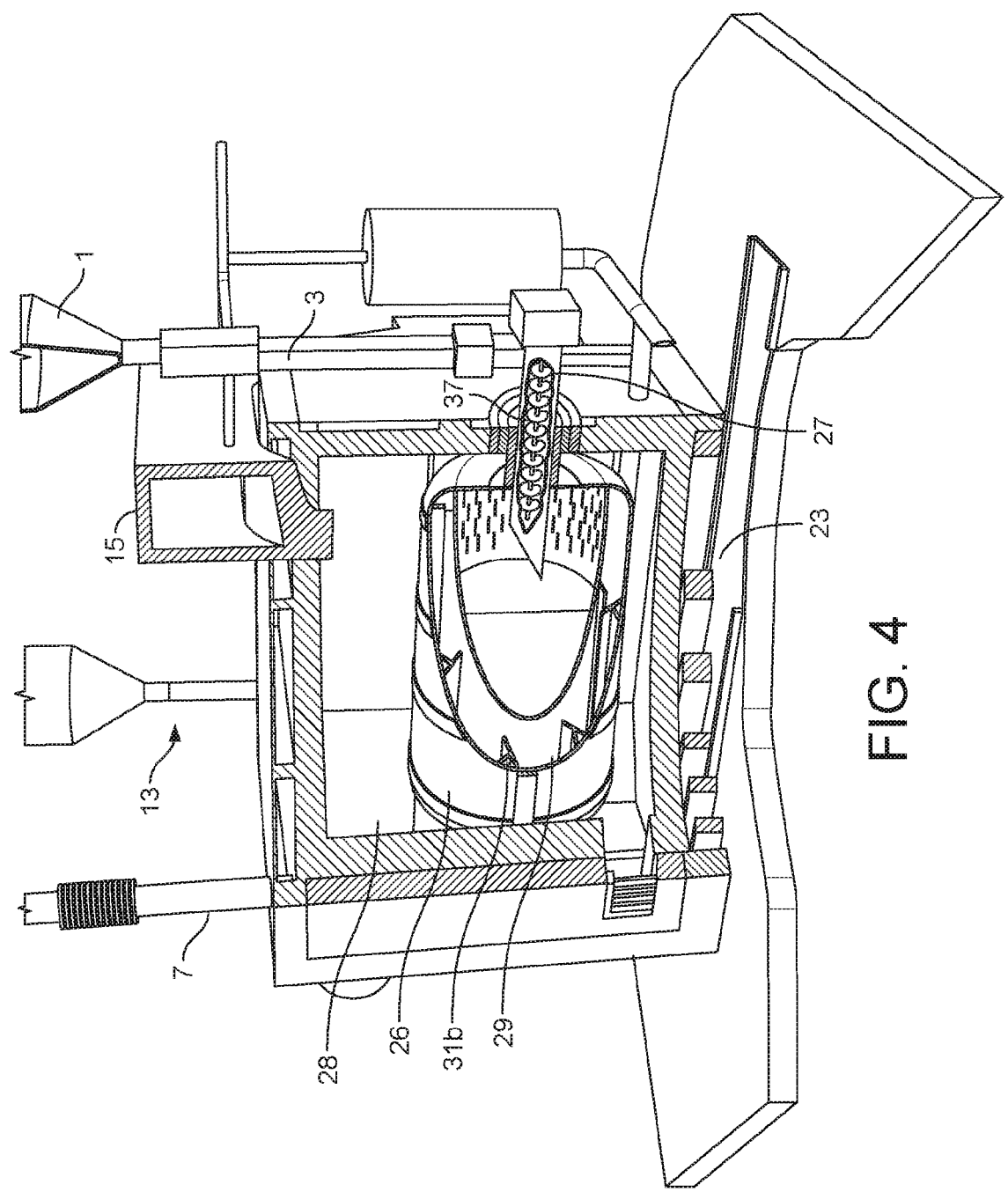
FIG. 4 is perspective view with a cut-away section showing the inner and outer retort of the retort structure of the pyrolysis unit of the first embodiment.
Figure 8:
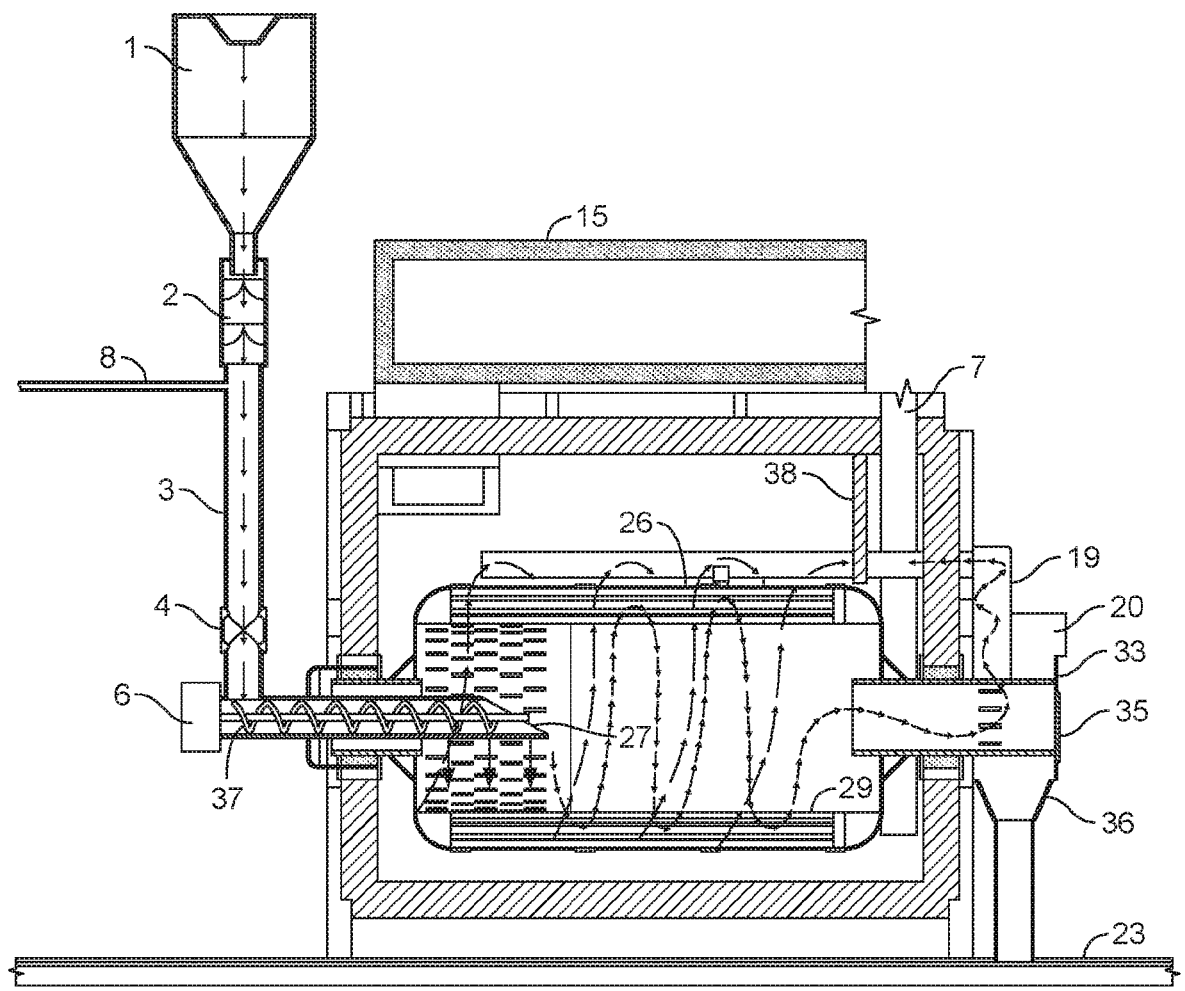
FIG. 8 shows a sectional side elevation of the second embodiment.
Figure 9:
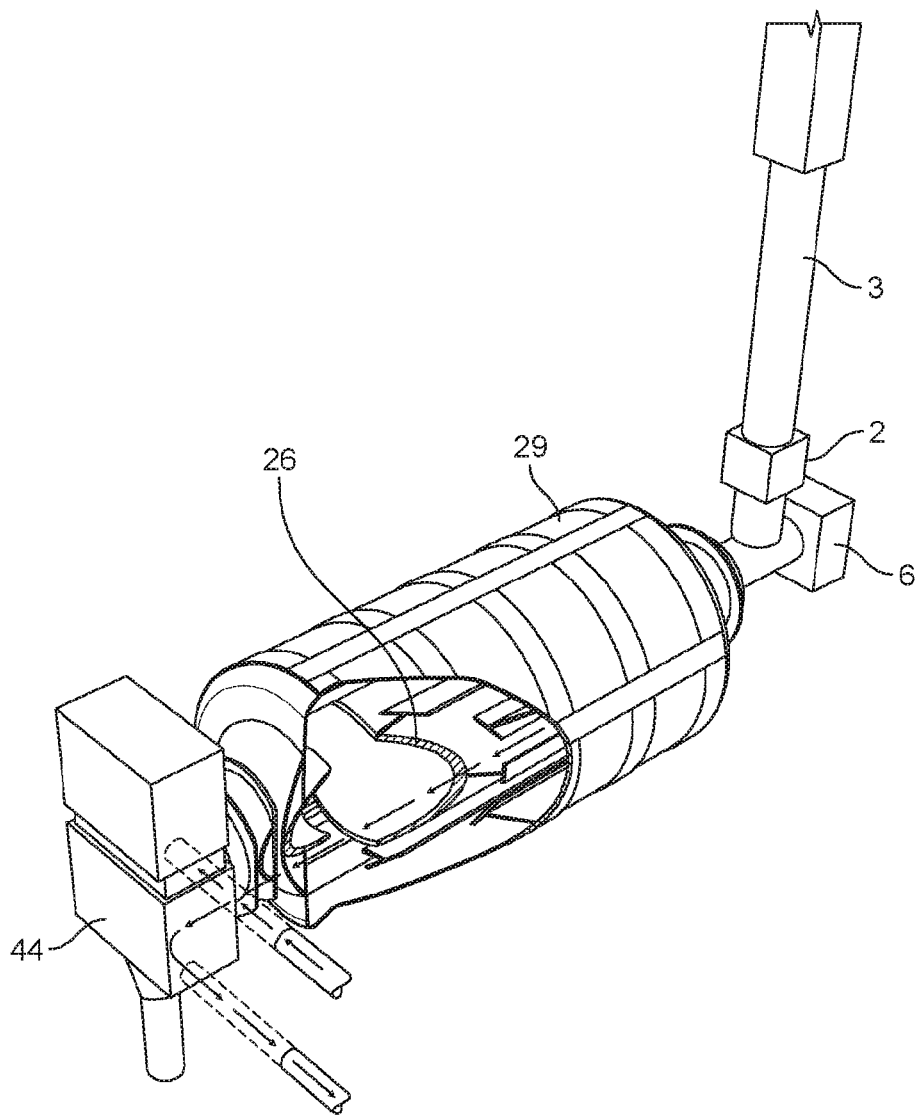
FIG. 9 is an exploded sectional perspective view of part of the second embodiment.

A portion of the substantially horizontal pipe 27 may be located within the retort structure. The feedstock can exit the substantially horizontal pipe 27 into the retort structure. As shown in FIGS. 4, 5 and 8, the retort structure includes an inner retort 29. The inner retort has holes in its surface to allow feedstock to pass from the inner retort 29 to an outer retort 26. The outer retort has a larger cross-sectional diameter than the inner retort thereby forming an annular cavity between the two. The inner retort 29 and the outer retort 26 are coaxial, with the inner retort 29 being located substantially within the outer retort 26 and both are substantially hollow and cylindrical in shape. The inner retort 29 carries outward-facing vanes 31a and the outer retort 26 carries inward-facing vanes 31b, which act as in the above described prior art to increase the dwell time of the char. The structure of the vanes 31 is discussed in greater detail below.

The inner 29 and the outer retort 26 rotate around a common, substantially horizontal axis. The common axis extending through the centre of the circular cross-section of the inner and outer retorts. The horizontal pipe 27 is positioned to allow feedstock to enter a first end of the retort structure, and is preferably positioned to allow feedstock to enter the inner retort 29.

Within the retort structure cavity, a pyrolysis process takes place. The airlock 2 and the side feed airlock 4 prevent, or substantially prevent, air and other ambient gases from entering the retort structure. Accordingly, the pyrolysis is pure pyrolysis in a $CO_2$ atmosphere.

The retort structure is inclined at an angle to aid throughput of feedstock. In one aspect of the present invention, the angle of inclination is 1/10 (i.e. 6 degrees to the horizontal) with the input end higher than the output end. It will be understood that although the axis has previously been described as substantially horizontal, the angle of inclination will cause the axis to incline along with the retort structure.

Additionally, the retort structure is resistant to toxic materials and acidic erosion. Accordingly, the present pyrolysis unit is capable of processing hazardous materials and industrial waste.

As mentioned above, the inner and outer retort structures rotate around a common axis. The rotations are driven by a retort drive motor 20 via drive gear 35). Preferably the retort drive motor 20 is capable of alternating its direction of rotation under control of the control device 100. In other words, the rotations need not be limited to either a clockwise rotation or a counter clockwise rotation. Preferably, a given number of rotations in one direction are followed by a number of rotations in the opposite direction. For example, four clockwise rotations could be followed by a single counter clockwise rotation. Such alternation of the rotation direction prevents feedstock, char and tar from bulking or forming a bridge between the surface of the inner retort 29 and the outer retort 26. Accordingly, the time between cleaning the retort structure may be increased, and maintenance costs reduced.

Figure 10:
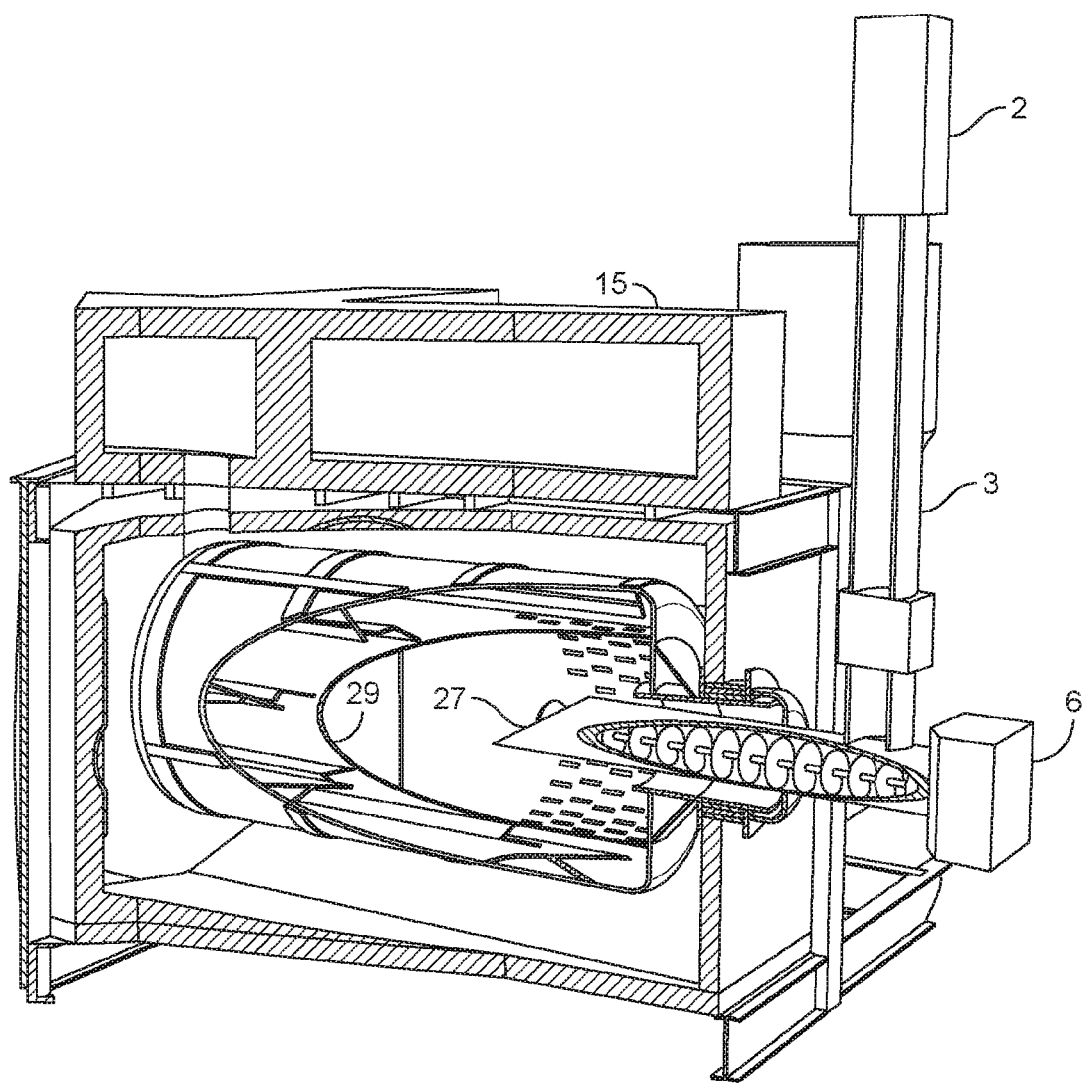
FIG. 10 is perspective view with a cut-away section showing the inner and outer retort of the retort structure of the pyrolysis unit of the second embodiment.
Figure 11:
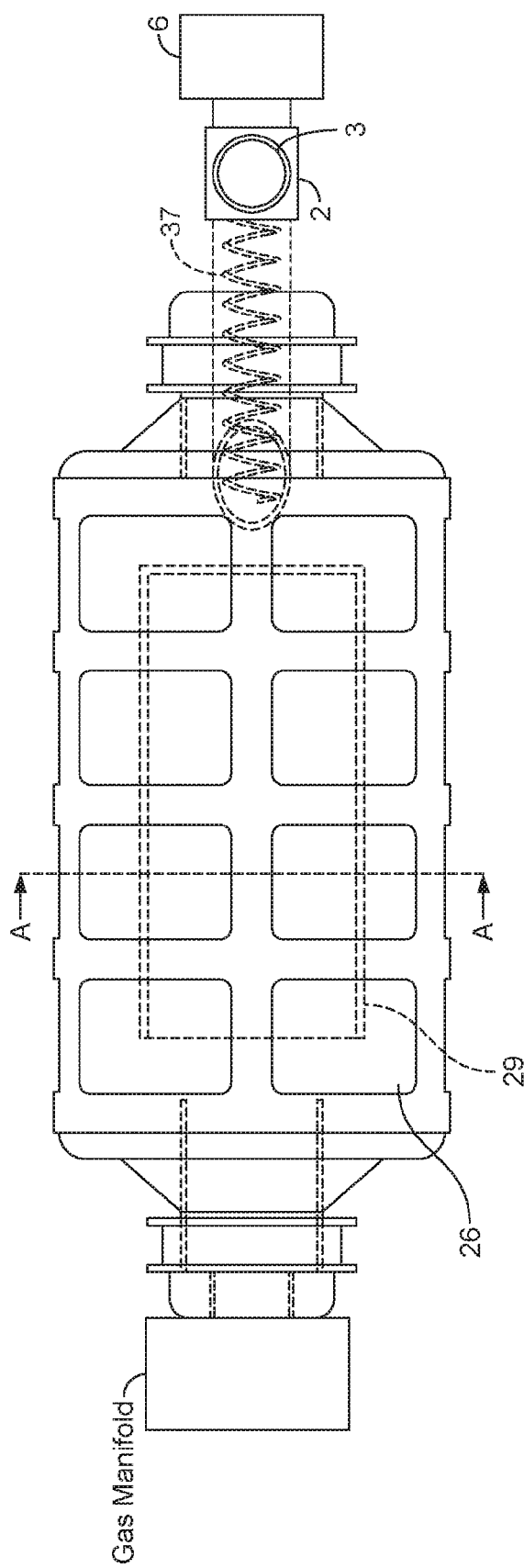
FIG. 11 is a side elevation of the retort structure of the second embodiment.
Figure 12:
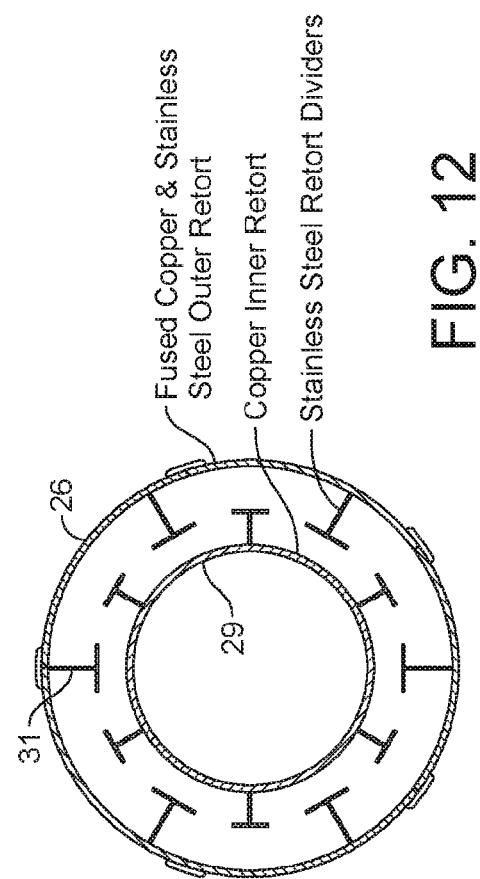
FIG. 12 is a sectional view of the retort of FIG. 11 along a line A-A thereof.

The inner and outer retort structures 26, 29 are at least partially constructed from copper. Copper is conventionally considered too soft for use in a rotating retort designed for higher pyrolysis temperatures (800 to 1300 degrees). However, with regard to FIG. 10, in the present arrangement the outer retort structure 26 is made from a nickel alloy cylindrical rectangular grid structure 26a with heavy copper cylindrical plate 26b explosively welded on the inside of that structure.

The process of explosively welding metals requires two concentric cylindrical shells (copper inside nickel) to be placed a small distance apart, and then brought together at a speed below the speed of sound within those materials by a controlled explosion. The pressure at the interface between the two metals must be greater than the yield strength of the metals. In this way, the metals deform plastically, and explosive welding occurs.

Explosive (or explosion) welding (or bonding) may be carried out by High Energy Metals, Inc. of Sequim, Wash. USA or Dynamic Materials Corporation of Boulder, Colo., US.

Having welded the two cylindrical shells together, an array of nickel alloy rectangles are milled off the surface leaving the underlying copper plate 26b exposed, within a cylindrical rectangular nickel alloy grid structure 26a in place.

The advantages of explosive welding include retaining the qualities of the parent metals (e.g. nickel alloy and copper). In the present arrangement, a retort is formed that provides the high temperature strength of the nickel alloy structure with the conductivity of the copper plates. The two materials have close thermal coefficients of expansion so the retort can withstand high temperatures, and an explosive welded joint results in no electrolytic action across the Ni/Cu interface. The two metals form a strong interface, with only very limited intermixing across it.

Referring again to FIGS. 4, 5, and 8, the retort structure is located within a thermally insulated retort housing 40. The thermally insulated retort housing 40 is preferably a cuboid, which allows for ease of construction, and transport and may also help the rigidity of the pyrolysis unit. The atmosphere within the retort structure is isolated from the atmosphere inside the retort housing 40, but external to the retort structure. In this embodiment, the pyrolysis unit, including at least the retort housing 40 and the retort structure, forms a rigid, compound unit capable of being inclined as a single unit via a hydraulic arrangement, such as a pair of hydraulic pistons adjacent the input end of the unit pivoting the unit around a pivot axle adjacent the discharge end. To aid rigidity, the pyrolysis unit may comprise a steel outer shell lined with refractory ceramic bricks.

In the accompanying figures, the substantially horizontal pipe 27 enters the retort housing 40 via an airtight housing 5. Accordingly, the atmosphere within the retort housing may only escape via the exhausts 7. Alternatively, the substantially horizontal pipe 27 may be located within the retort housing 40, and the feed pipe 3 may enter the retort housing 40 via an airtight housing 5 located on surface of the retort housing 40.

Referring to FIG. 5, at a second (discharge or exit) end of the retort structure, opposite to the first end, beyond furnace gas diffuser plate 38 a retort exit pipe 33 is located to allow a mixture of gas and particulate matter to exit the retort structure. The retort exit pipe 33 extends out of the retort structure along the common axis. A holed section of the exit pipe 33 has holes throughout the surface of the exit pipe located above a substantially vertically-extending char pipe 36. Char falling through the holes in the holed section falls into the char pipe 36 via an airlock 39. Further, the holes allow the mixture of gas and particulate matter to rise through a gas duct 19 above and proximate to the holed section. Gas may be impelled to travel by a gas booster fan 18. An access hatch 34 allows maintenance access.

An output end of the gas conduit 9 may form a Syngas outlet 9, which may be connected to another piece of machinery, such as a generator. Alternatively, the Syngas outlet may be connected to a storage vessel such as a gasometer, following a gas clean up operation.

The innovative arrangement of components in the present aspect allows the size of the pyrolysis unit to be reduced. For example, a pyrolysis unit of the present aspect, which is rated a 6-tonne unit, can be less than 4.8 meters in width. Accordingly, such a unit can be transported easily via road, rail, sea or air.

The heating system for the pyrolysis unit will now be described. In general, the heating system comprises at least one heat source and a heating duct to transfer heat from the heat source to the interior of the thermally insulated retort housing. The heating system may comprise additional heat sources. It will be understood by those skilled in the art, that multiple heated areas may be supplied by a single heating source. In this embodiment the heating system, the retort structure and the retort housing 40 may be inclined together as a single, compound unit by hydraulic rams under control of the control unit 100.

A furnace feed 13 is connected to a combustion control unit 21. The combustion control unit 21 is also connected to the combustion zone of a main furnace 17.

The heat duct 15 is attached to the main furnace 17 and connected to the thermally insulated retort housing so that heated gas from the furnace may enter the thermally insulated retort housing, thus heating the retort structure.

Heated gas exiting the main furnace 17 enters the heat duct 15 and travels toward the retort housing 40. The heated gas then enters the retort housing 40, whereupon the retort structure is heated.

The heating system can operate at between 1250° C. and 1600° C. Those temperatures are capable of heating the retort structure to between 800° C. and 1000° C. (for example, 850° C.).

The temperature of the retort structure is therefore capable of thermochemically breaking down ("cracking") feedstock placed within. The gas leaving the feedstock The path of the feedstock will now be described with reference to FIGS. 1-5.

When the feedstock undergoes the pyrolysis process inside the retort structure, it produces char and gas. The char then follows one path whilst the gas follows a separate path. It will be understood that although the paths are described as separate, they may interconnect at certain points.

Feedstock enters the retort feed 1, passes the double action airlock 2, and falls through the feed pipe 3. The double action airlock 2 minimises or prevents air entering the retort structure, thereby allowing a pure-pyrolysis process to occur. The feedstock passes through the side feed airlock 4 and is transported via a substantially horizontal pipe 27 into the inner retort 29. The retort structure may be variably inclined so as to speed up, or slow down, the rate at which the feedstock passes through the retort structure. In other words, the dwell time of the feedstock inside the retort structure may be adjusted by tilting the retort structure.

As mentioned above, the retort structure rotates around the common axis of the inner retort 29 and the outer retort 26. This rotation helps to physically break down the feedstock. The retort being able to rotate and counter-rotate further prevents the feedstock forming a bridge between the surfaces of the retort structure or the vanes thereon.

The atmosphere inside the retort may be rich in $CO_2$ supplied by the $CO_2$ feed supply 8. It is known in the art that such a $CO_2$ rich environment (in controlled volumes) provides an increased yield of Syngas at a higher quality for a given feedstock during a pyrolysis process. This process also potentially facilitates the use of a greenhouse gas in a way which is less harmful to the environment.

Inside the retort structure the gas path and the char path diverge. The gas path will be now be described, followed by the char path.

The gas exiting the retort structure via the retort exit pipe is Syngas combined with some particulate matter. The particulate matter may comprise particulate char, droplets of tar or other matter not completely broken down in the pyrolysis process which occurs in the retort structure.

The mixture of Syngas and particulate matter exiting the system may include oils and tar. The residual particulate matter still present in the mixture generally cannot be broken down further by the temperatures in the retort structure. Conventional pyrolysis units would either dispose of the residual particulate matter or, if the residual particulate matter contains oils and tars, send them to a refinery for further processing. Conventional pyrolysis units remove the oils and tars via a quenching and/or cleaning process, for example, passing the gas exiting the conventional pyrolysis unit through a quenching spray.

The mixture of Syngas and residual particulate matter is compressed inside compressor 10. The temperature inside the retort housing may be sufficient to raise the temperature of the retort structure to between 800° C.-1000° C.; in one embodiment, the temperature of the retort structure is approximately 850° C.

The char path will now be described with regard to FIGS. 1-5. It will be noted that whilst the gas path operates in a substantially oxygen free environment, the char path can be exposed to air.

After exiting the retort structure via the retort exit pipe, the char falls through the char pipe 36 and onto the conveyor 23. The conveyor transports the char to the base of hopper feed 14 which, in turn, transports the char to the top of the hopper feed 14. An auger (not shown) may be included in the hopper feed 14 to accomplish such transport. From the top of the hopper feed 14 the char is deposited within furnace feed 13. The char entering the furnace feed 13 may be mixed with additional fuel, such as fossil fuels, or other feedstock. Alternatively, the char may enter the furnace feed 13 alone. It will be understood that, although a gravitational feed has been herein described, other methods of feeding the furnace with char and/or additional fuel are within the scope of the present invention.

Figure 3:
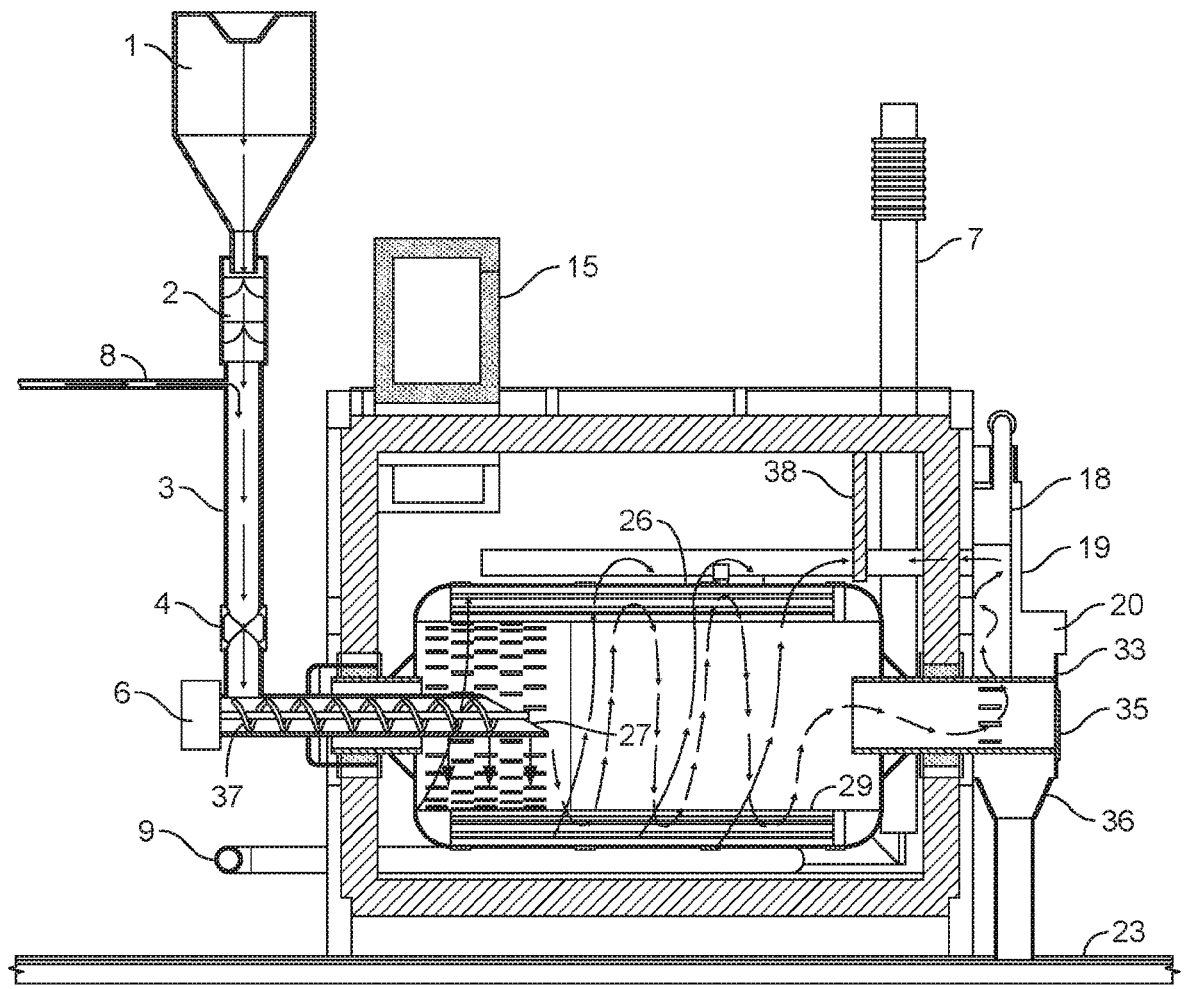
FIG. 3 is a side elevation of that pyrolysis unit.

With specific reference to FIG. 3, after passing through the furnace feed 13, the char enters the heating system. The heating system can operate at a temperature of approximately 1600° C. The temperature inside the heating system is sufficient to burn the char, which becomes hot gas and slag. The hot gas is directed toward the heat duct 15. The slag is directed toward a slag tap 11.

The hot gas can exit the retort housing 40 via the exhaust 7. It is within the scope of the present invention to include more than one exhaust 7. The exhaust 7 preferably includes a flexible joint and/or a restrictive throat so that the exhaust is controllable. Such control allows the multi-stage pyrolysis unit of an aspect of the present invention to comply with varying official regulations in a number of countries.

DETAILED DESCRIPTION OF A SECOND PREFERRED EMBODIMENT

In this embodiment, to the extent they are not discussed below, features having the same reference numbers as in the first embodiment are as described above and need no further explanation.

The operation of the retort is as described in the first embodiment. The inner radius of the outer retort 26 is approximately 0.71 m, and the inner radius of the inner retort is approximately 0.43 m, leaving a gap of around 0.25-0.3 m between the inside of the outer retort 26 and the outside of the inner retort 29. A pair of nickel alloy or stainless steel end-caps mount the cylindrical wall of the outer retort to the retort drive gear 35 at one end and a bearing at the other end. The outer retort 26 therefore supports its own weight, and undergoes periodic torsional loads as it is driven to rotate in alternate rotational senses by the motor 20, which loads are borne by the nickel framework.

The cylindrical wall of the inner retort 29 is mounted within the outer retort at the end-caps, and by bracing stainless steel dividers along its length. As the cylindrical wall of the inner retort 29 does not take any of the torsional or gravitational load, it does not require the same strength as the outer retort and it can therefore be made more cheaply of copper without nickel reinforcement. Likewise, the vanes 31 carried on both retorts can be made of copper alone.

Typically, in use, when the temperature outside the retort is maintained around 850 C, the temperature inside the inner retort 29 will be around 700 C due to cooling by newly input feedstock. The feedstock then falls through the holes or slots in the portion of the wall of the inner retort 29 (best seen in FIGS. 5 and 8) which is currently at the bottom, into the space between the two retorts, where its dwell time is increased by the vanes 31, until it can fall back into the inner retort 29 and so on along the length of the retort.

As best seen in FIG. 21, the vanes 31 are T-shaped in cross-section, each made up of a fin running longitudinally along the retort surface, with a plate at its outer end. The symmetrical cross-section allows the retort to operate in the same manner regardless of the rotational direction. The further ends of the vanes projecting inwards from the outer retort and those projecting outwards from the inner retort lie on approximately the same cylindrical surface. Thus, when charred solid matter falls out from an outer vane, it will fall into an inner vane and vice versa.

The syngas exits into a manifold feeding a wide diameter pipe, via which it passes to a second heat recovery steam generator (HRSG) 45b, in which it is passed via pipes through a boiler to generate steam used to drive the steam turbine 50. After being thus cooled, it is passed to a scrubber 62 of conventional type which extracts impurities.

It will be apparent that the apparatus has a number of advantages. Firstly, the apparatus operates to destroy solid waste materials which would otherwise cause environmental damage. Pyrolysis in a carbon dioxide atmosphere without oxygen creates a genuine pure pyrolysis environment, different from and cleaner than prior waste incineration and gasification systems. The units can be run on all carbonaceous products including biomass, municipal solid waste, hazardous waste, tyres, sewage etc while complying with all regulations and requirements currently in force.

Secondly, it produces from them a number of useful end-products. As solids, vitreous slag may be used as a building material. The char which is produced may be used as a fuel in the apparatus itself as described above. However, additionally, if the wood content of the waste feedstock is high, the char makes a clean, charcoal-like fuel which can be sold for use instead of fossil fuels, as briquettes or as torrified pellets (for which see Anna Austin "Glorified, Torrified & Cofired", Biomass Power & Thermal, September 2011 pp 29-33).

As gases, hydrogen and syngas are both useful fuels. Although syngas produced according to the embodiments may in some cases have a different calorific content to natural gas, it can be used as a substitute with appropriate modifications, and is clean enough to run a reciprocating engine or gas turbine, producing emissions that are the same or less than that given by natural gas. If the syngas produced by the embodiments is being sold as a fuel, the calorific content of the syngas can be controlled by maintaining an appropriate mixture of waste feedstock materials. The calorific values of various types of solid waste are well known, but a convenient table is found at http://www.pyromex.com/waste%20types/values_asc.htm. In general, dried sewage and some agricultural materials such as hay have lower energy content by weight, and plastics have higher energy contents by a factor of 2-3.

The units of preferred embodiments can be installed extremely quickly and can be dismantled and moved to an alternative location just as easily. They are capable of high outputs of energy from a relatively small and compact unit which meets all current environmental issues and requirements and also solves the problems of the long standing tar and PAH issues by using high gas temperatures and variable dwell times.

Other Aspects, Embodiments and Modifications

In the preceding embodiments, a cylindrical rotating retort has been described. However, in other embodiments, different shapes could be adopted. For example, the cross-section does not need to be constant along the entire length of the retort—it could flare or narrow downwards.

Likewise, whilst a circular cross-section is convenient to manufacture, non-circular cross-sections could be used; an elliptical cross-section increases the dwell time on some parts of the retort which may be useful in some cases. Many other cross-sections could be used, though sharp corners might tend to trap material. The rotation employed might likewise be provided using elliptical gears or other means to vary the rotational speed within each rotation, so as to control the dwell time on different sectors of the retort.

Whilst rotation, unidirectional or bidirectional, has been described, it would be possible to turn the retort through less than an entire turn before reversing it—in other words, to apply a rotational oscillation. In this case, the retort does not need to be enclosed but could be a concave, for example semicircular, surface.

Figure 13:
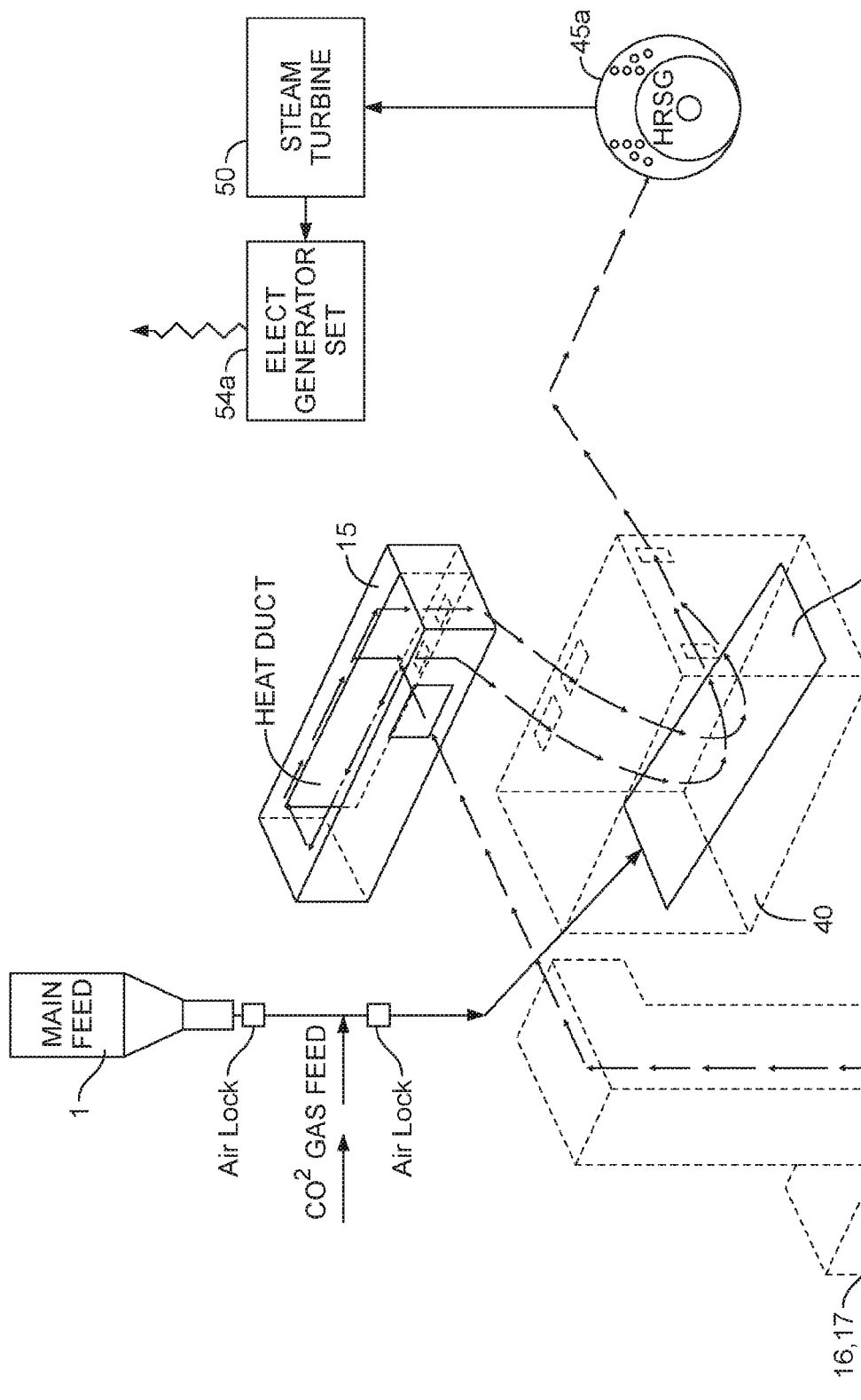
FIG. 13 is a diagrammatic view of a pyrolysis structure of a third embodiment.

Finally, as shown in FIG. 13, it would be possible to provide, instead of a retort vessel, a flat sheet 26 corresponding to an "unwrapped" version of the cylindrical retort, with an upper planar copper sheet supported by a planar framework of nickel alloy or stainless steel, preferably explosively welded together. The sheet is slightly inclined, and a drive is connected to oscillate the sheet so that it acts as a jigging conveyor (as disclosed for example in GB148844 or U.S. Pat. No. 3,191,763). The previous embodiments do not make use of the full surface area of the retort, as the feedstock will tend to fall to the bottom of the retort and pile up there. In this embodiment, feedstock can more evenly cover a larger portion of the copper surface where pyrolysis can take place. Heat can be applied from above and/or below. The sheet need not be inclined if a suitable drive is employed in which the backwards part of each vibration is faster than the forwards part, and in this case, ribs may be provided on the plate to assist in preventing backwards motion, as is known in the art.

The terms "horizontal" and "vertical" herein are with reference to the main axes of the apparatus. It is understood that the entire apparatus is, in use, inclined to the horizontal plane and hence "horizontal" and "vertical" herein are not used by reference to the Earth's surface. Whether or not used in conjunction with the word "substantially", "horizontal" and "vertical" herein are intended to imply, respectively, "more horizontal than vertical" and "more vertical than horizontal" rather than as terms of geometrical precision.

Recovery of the heat expended in heating the retort, and also the calorific value of by-products of the above-described processes, is possible. The retort of the present invention may be capable of gasifying certain types of feedstocks without further processing. However, it is also possible to provide a pre-processing stage; and/or post-processing stages. These may each be a further retort as described above, but some preferred embodiments of such pre- and post-processing stages and energy recovery processes and structures are described in our co-pending applications incorporated in their entirety by reference, filed the same day as the priority application for the present application, GB1503765.8, and with the following titles and application numbers:

GB1503766.6 "Pyrolysis Methods and Apparatus"
GB1503760.9 "Pyrolysis or Gasification Apparatus and Method"
GB1503772.4 "Temperature Profile in an Advanced Thermal Treatment Apparatus and Method"
GB1503770.8 "Advanced Thermal Treatment Apparatus"
GB1503769.0 "Advanced Thermal Treatment Methods and Apparatus"

A person skilled in the art would understand that various types of heat source and fuels therefor could be used, in addition to those described above and in the co-pending applications mentioned above.

Many other variants and embodiments will be apparent to the skilled reader, all of which are intended to fall within the scope of the invention whether or not covered by the claims as filed. Protection is sought for any and all novel subject matter and combinations thereof disclosed herein.

The invention claimed is:

1. A pyrolysis apparatus comprising an outer retort structure constructed at least partially of a sheet of a high thermal conductivity metal directly affixed, at a first side of the sheet of the high thermal conductivity metal, to a framework of a high temperature strength metal, the framework of high temperature strength metal having openings there through; and wherein the first side of the sheet of the high thermal conductivity metal is exposed through the openings, wherein the sheet of the high thermal conductivity metal is explosively welded to the framework of the high temperature strength metal.

2. Apparatus according to claim 1, in which the high thermal conductivity metal comprises copper.

3. Apparatus according to claim 1, in which the high thermal conductivity metal is high purity copper.

4. Apparatus according to claim 1, in which the high temperature strength metal is a nickel alloy.

5. Apparatus according to claim 1, in which the high temperature strength metal is a stainless steel.

6. Apparatus according to claim 1, comprising a rotatable retort.

7. Apparatus according to claim 6, in which said retort is cylindrical.

8. The apparatus of claim 6, comprising a first body of co-rotating inner and outer bodies.

9. The apparatus of claim 8, wherein said inner body is constructed of a high thermal conductivity metal.

10. The apparatus of claim 9, in which the inner body contains holes to allow particulate material to pass therethrough.

11. The apparatus of claim 9, in which the inner and outer bodies carry vanes to retain particulate material.

12. The apparatus of claim 11, in which the vanes are symmetrical.

13. The apparatus of claim 12, in which the vanes have a T-shaped cross-section.

14. The apparatus of claim 11, in which the vanes are constructed of a high thermal conductivity metal.

15. The apparatus of claim 6, further comprising a rotatable drive configured to rotate the retort.

16. A gasifier comprising an outer retort pyrolysis structure at least partially constructed of a sheet of high thermal conductivity metal directly affixed, at a first side of the sheet of the high thermal conductivity metal, to a framework of high temperature strength material and enclosed within a thermally insulated housing, and a heating system capable of heating the structure to a temperature sufficient for pyrolysis of a calorific material, wherein the first side of the sheet of the high thermal conductivity metal is exposed to the heating system through openings of the framework of high temperature strength material, wherein the sheet of the high thermal conductivity metal is explosively welded to the framework of the high temperature strength metal.

17. The gasifier of claim 16, further comprising means for varying the inclination of the pyrolysis structure.

18. A method of making an outer retort pyrolysis structure intended for gasifying feedstocks at high temperatures, comprising:
   providing a first sheet of a high thermal conductivity metal;
   providing a second sheet of a high temperature strength metal;
   explosively welding said first and second sheets together; and
   forming openings through the second sheet thereby exposing at least a portion of the first sheet of the high thermal conductivity metal through the openings formed in the second sheet.

19. The method of claim 18, wherein the exposing comprises milling away portions of said second sheet to leave the at least the portion of the first sheet exposed through the second sheet.

* * * * *